Feb. 16, 1943.    J. B. TEGARTY    2,311,317
STEERING WHEEL OR OTHER ARTICLES
Filed June 1, 1939    4 Sheets-Sheet 1
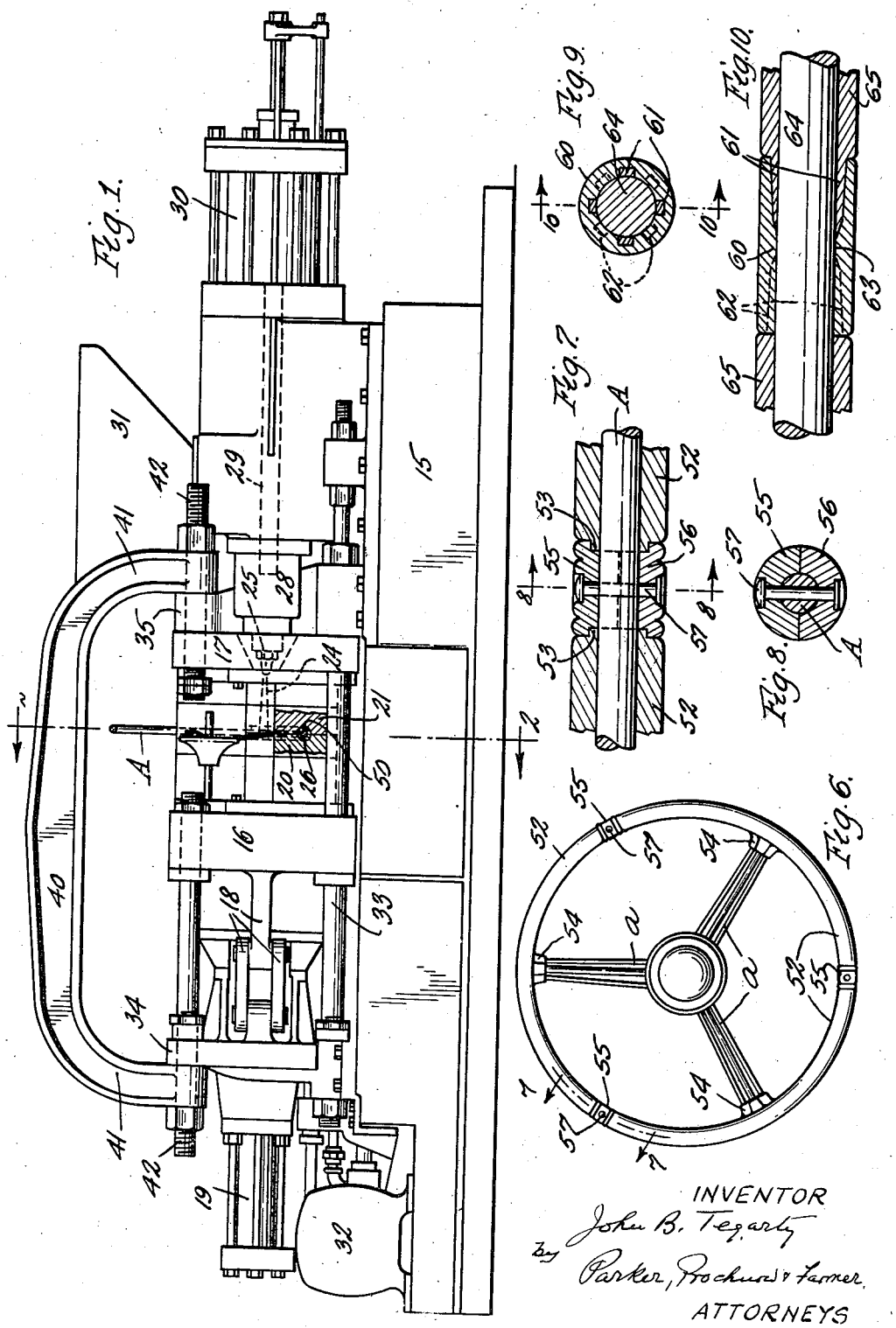
INVENTOR
John B. Tegarty
by Parker, Brockman & Farmer
ATTORNEYS Feb. 16, 1943.   J. B. TEGARTY   2,311,317
STEERING WHEEL OR OTHER ARTICLES
Filed June 1, 1939   4 Sheets-Sheet 2
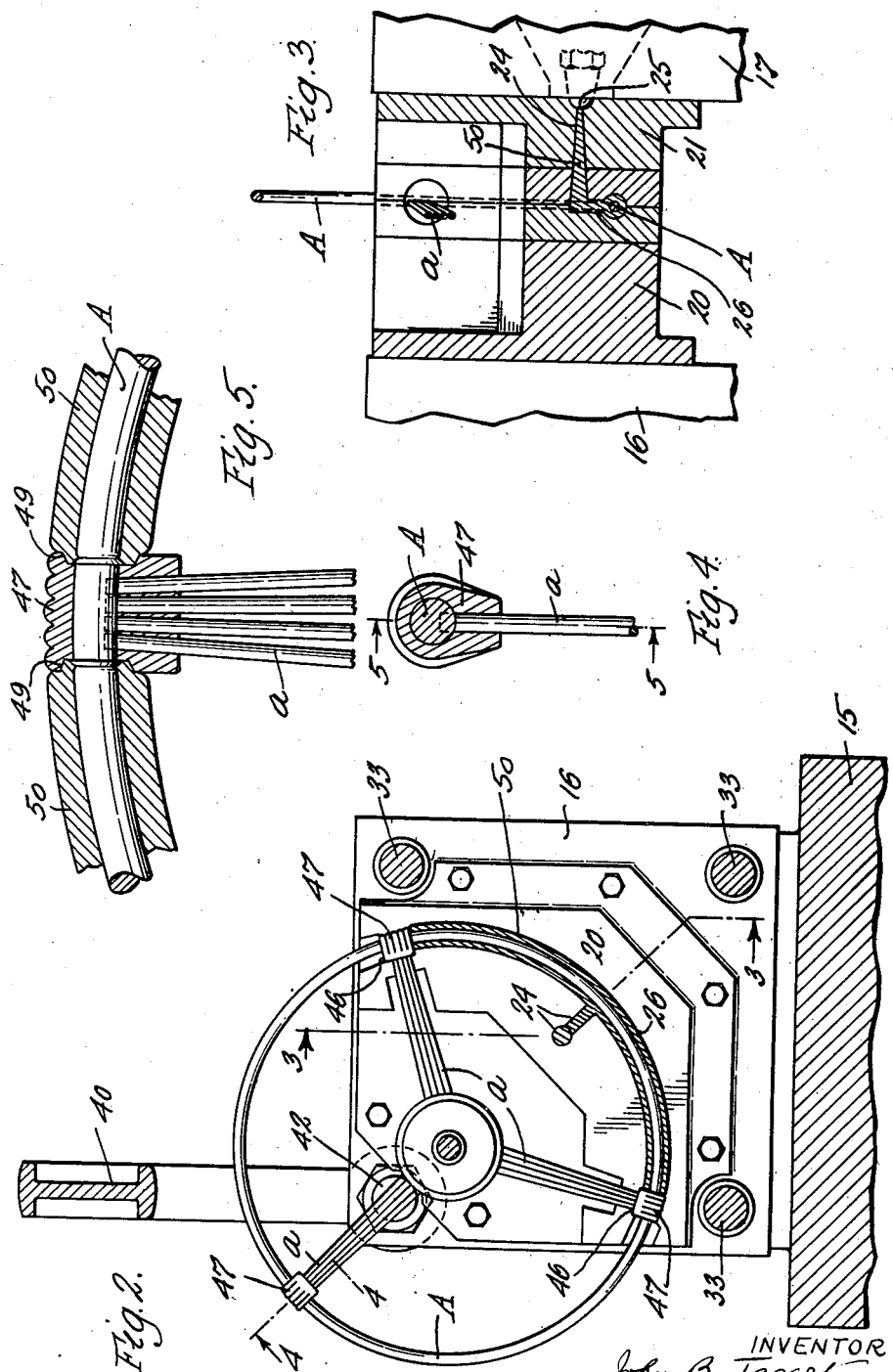
INVENTOR
John B. Tegarty
By Parker, Rockwow & Farmer
ATTORNEYS.

Feb. 16, 1943. J. B. TEGARTY 2,311,317
STEERING WHEEL OR OTHER ARTICLES
Filed June 1, 1939 4 Sheets-Sheet 3

INVENTOR
John B. Tegarty
BY
Parker, Rockwood & Farmer
ATTORNEYS

Feb. 16, 1943.   J. B. TEGARTY   2,311,317
STEERING WHEEL OR OTHER ARTICLES
Filed June 1, 1939   4 Sheets-Sheet 4

INVENTOR
John B. Tegarty
BY
Parker, Rockwood & Farmer.
ATTORNEYS

Patented Feb. 16, 1943

2,311,317

UNITED STATES PATENT OFFICE 2,311,317

STEERING WHEEL OR OTHER ARTICLES

John B. Tegarty, Buffalo, N. Y., assignor to Sterling Injection Molding, Inc., Buffalo, N. Y.

Application June 1, 1939, Serial No. 276,855

1 Claim. (Cl. 74—552)

This invention relates to improvements in articles formed at least in part of a metal and in part of a thermoplastic or a thermo-setting material. This application is in part a division of my pending application Ser. No. 239,137, filed November 5, 1939.

Thermoplastic materials, such for example as cellulose acetate, are plasticized by heat and forced under high pressure into a mold cavity in which the material is cooled and solidified. Machines now available for use in connection with this type of molding are limited in capacity because of the characteristics of thermoplastic materials and because of conditions under which the molding must take place, so that only a relatively small quantity of thermoplastic material can be extruded and molded at one time.

One of the objects of this invention is to produce an article including more plastic material than can be molded by one operation of the machine, by forming the plastic material thereon sectionally and progressively.

I have also found that in the case of articles having relatively large parts of plastic material molded in contact with metals, the plastic material will crack when the article is subjected to changes in temperature. This cracking is due to the difference in coefficients of expansion of plastic material and metals. It also sometimes happens that in articles, such as steering wheels, having a metal frame or core surrounded by plastic material, the metal frame or core will twist or writhe, which also causes the plastic material to crack or split.

It is, consequently, a further object of this invention, to provide an article having a metal frame or core with a covering of plastic molded material formed in sections having joints or connections at their ends which permit the metal frame or core to change its form without producing cracks or splits in the plastic molded material. Another object of this invention is to provide a steering wheel having a metal core about which a plastic molded material is applied in sections, the ends of each section being free to move to a limited extent relatively to other parts of the wheel. Another object is to provide a wheel of this kind in which the ends of each section interfit with adjacent parts of the wheel to provide a limited movement of the ends relatively to such adjacent parts.

A further object of the invention is to provide articles of improved construction which can be formed by progressively sectionally molding thermoplastic material thereto. A further object is to provide articles of improved construction including a preformed article having enlargements arranged at intervals therein which may cooperate with a cavity in a mold to close the ends thereof and with the molded sections to secure these sections in the desired relations to the article.

Other objects of this invention will appear from the following description and claim.

In the accompanying drawings:

Fig. 1 is a side elevation of a molding machine of improved construction for use in connection with a process embodying this invention and showing an article embodying this invention being operated upon.

Fig. 2 is a fragmentary transverse sectional elevation thereof, on line 2—2, Fig. 1.

Fig. 3 is a fragmentary longitudinal section thereof, on line 3—3, Fig. 2.

Fig. 4 is a fragmentary transverse section, on an enlarged scale, of an article formed in accordance with my improved process, the section being taken on line 4—4, Fig. 2.

Fig. 5 is a section thereof, on line 5—5, Fig. 4.

Fig. 6 is a face view of another article embodying this invention and formed in accordance with my process.

Fig. 7 is a section thereof, on an enlarged scale, on line 7—7, Fig. 6.

Fig. 8 is a transverse section thereof, on line 8—8, Fig. 7.

Figs. 9 and 10 are respectively transverse and longitudinal sections of a joint or connection between adjacent molded portions of another article formed in accordance with my invention.

Figure 11:
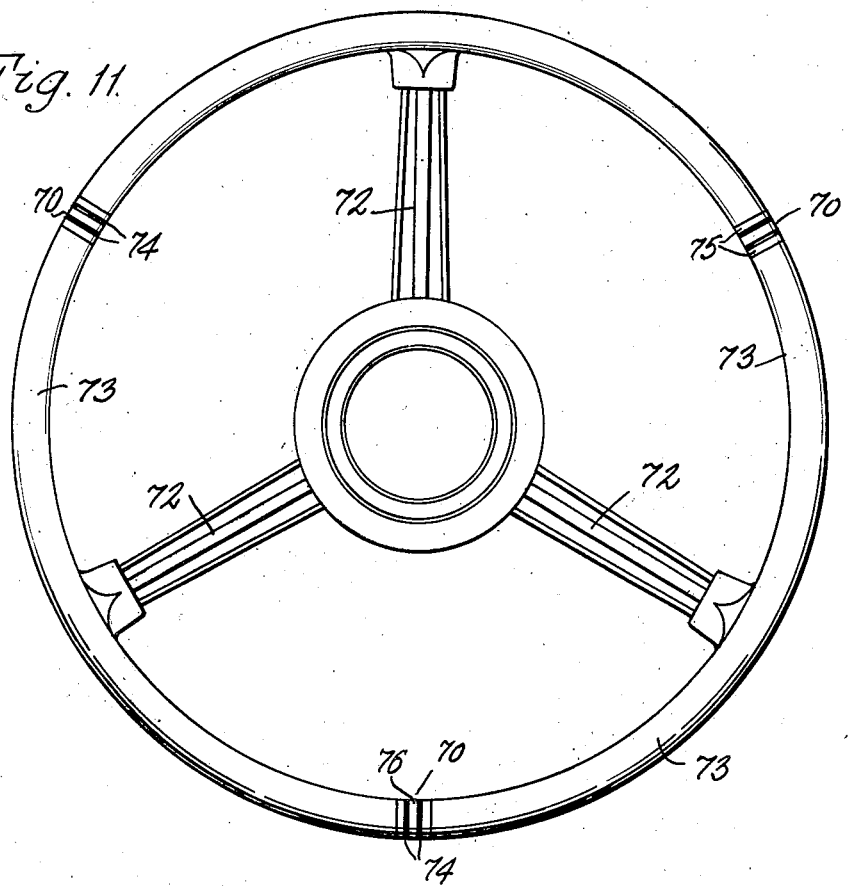
Fig. 11 is a plan view of a steering wheel of modified construction.

Steering wheels and other articles having a metal core covered with plastic materials were heretofore made in such a manner that the entire covering was formed as a unitary piece. This, in the case of thermoplastic materials, necessitated the use of a relatively large machine capable of molding the entire covering of plastic material in a single operation, or in the case of other plastic materials, relatively large presses were required to form the entire covering as a single unitary piece.

In accordance with this invention, the steering wheels or other articles are formed in such a manner that the molded plastic covering material may be applied to the base or metal core of the article in separate parts or sections. This has the advantage that the article may be formed on a much smaller machine, since only a small portion of the molded plastic covering material need be applied to the article at one time. My improved articles have the further very decided advantage in that the danger of cracking or splitting of the covering material, due to radically different coefficients of expansion and contraction of the molded plastic material and the metal, is eliminated. In the case of an article with a unitary covering, the covering will split or crack when exposed to low temperatures, or when the core twists or writhes. By forming the molded plastic covering material in separate sections, disconnected from each other at their ends, the objectionable cracking or splitting of the covering material is avoided, since the ends of the separate pieces or sections of the covering material may move relatively to each other either in a direction toward or from each other to compensate for these differences in expansion and contraction, or in a rotary direction relatively to each other to compensate for twisting or writhing of the metal core. It is not necessary in accordance with this invention that the several sections of the covering material be successively formed or molded, since if a machine of sufficiently large capacity is available, the sections of the plastic covering material may be simultaneously molded, providing that the ends of the several sections of the covering material are not integrally secured to each other.

The terms "molded plastic material" or "molded plastics" as herein employed, are intended to include not only thermoplastic and thermo-setting materials, but also rubber compositions which may be molded to form a covering for a metal core.

Figs. 1, 2 and 3 show one form of molding machine for use in connection with the making of articles according to this invention, the machine shown being for use with extrusion or injection molding. The greater portion of this machine is of a standard construction as heretofore used, the machine being changed to enable the same to produce some types of articles of relatively large dimension in accordance with this invention. The machine shown in the accompanying drawings includes a base 15 provided with a pair of die supporting plates 16 and 17 suitably mounted on the machine, at least one of said plates being movable toward and from the other. The die plate 16, in the construction shown, is connected by means of a plurality of toggle links 18 arranged to be actuated by means of a plunger or piston arranged in a cylinder 19. When fluid under pressure is admitted into one end of the cylinder 19, the toggle links are moved toward and into dead center position for moving the die plate 16 toward the other die plate 17. 20 and 21 represent cooperating dies or molds of any desired kind suitably secured to the die plates 16 and 17, and 24 represents a passage formed in the die or mold 21 through which heat softened or plasticized thermoplastic material may pass from a nozzle 25 to a cavity 26 formed in the adjacent faces of the molds or dies. The nozzle 25 receives thermoplastic material from a heating cylinder 28, the thermoplastic material being extruded by means of a plunger 29, shown in broken lines in Fig. 1, which is actuated by means of a piston (not shown) arranged in a cylinder 30. 31 represents a hopper for thermoplastic material, from which the material may be fed in necessary quantities into the heated cylinder 28, when the plunger 29 is reciprocated. 32 represents a motor which operates suitable compressing means for supplying fluid under pressure to the cylinders 19 and 30, and 33 represents a plurality of tie rods or bars which connect a stationary frame member or plate 34 to which one end of each set of toggle links 18 is pivoted, with another fixed part 35 of the machine located adjacent to the die plate 17. These tie rods serve to hold fixed parts of the machine in correct relation to each other and prevent separation of the dies or molds due to the heavy pressure of the thermoplastic material in the mold cavity. The machine as thus far described, is of standard and well known construction, and this machine, as heretofore constructed, may be used in connection with the manufacture of certain articles according to my invention.

In order to enable this machine to operate upon objects of a looped or annular form, such for example as steering wheels, which are of greater diameter than the space between the tie rods 33, I have provided means whereby one or more of the straight tie rods may be replaced by other means for opposing the stresses resulting from the pressing of the dies or molds into contact. These means may be of any suitable form, for example, a tie member 40 of arched form may be employed, the end portions 41 of which extend transversely to the body portion and are arranged to be secured to the stationary machine parts 34 and 35 by means of short bolts 42. These arched tie members provide for a greatly enlarged space transversely of the machine in which wheels, frames or looped articles may be arranged, which extend beyond the dies or molds of the machine, for reasons hereinafter more fully explained. Consequently, as clearly shown in Fig. 2, this construction readily permits a comparatively large article, such as a steering well, to be positioned so that a part thereof may be operated upon by a relatively small machine. Obviously other means for supporting or bracing the machine against the pressure exerted against the die plates may be employed.

It will be noted in referring to Figs. 1 to 3 that the die used in connection with my improved process is of such form as to cooperate at one time with a portion only of the article, and the article may be turned or advanced into another position in which another portion of the article is to be molded. The die is also provided at the ends of the cavity 26 therein with suitable portions 46 which are formed to engage portions of the article to securely clamp the same in correct relation to the cavity in the mold. In case of a wheel, these parts of the mold may be formed so as to engage the preformed metallic base or core A of the rim of the steering wheel, or if desired, the clamping parts of the mold may engage with enlargements or anchoring portions on the rim of the steering wheel for securing the steering wheel in correct relation to the mold, and preferably these enlargements also close the ends of the mold cavity. If desired, the ends of these enlarged portions may be recessed or otherwise formed so as to provide parts into which thermoplastic material may flow or embed itself for providing secure anchorages for the ends of the sections of the thermoplastic material. In the construction shown in Figs. 1 to 5 inclusive, the preformed wheel rim base or core A is provided with enlarged portions 47 arranged at the spokes a of the wheel. These enlarged portions may be formed of metal, in which case they may, for example, be die cast on these portions of the wheel, or if desired, the enlarged portions may be made of thermoplastic material applied by means of the machine described in molds or dies having a corresponding cavity, to portions of the rim of the wheel at the outer ends of the spokes. In the construction shown, the enlarged portions 47 also form separating elements for the final thermoplastic sections and are provided with undercut or recessed end faces 49, but if desired, outwardly extending parts may be provided for anchorages for the final thermoplastic material applied to the wheel rim.

In the use of this machine to form my improved articles, the dies or molds are formed in such a manner that the mold cavity 26 is shaped to form a portion of the article, which in the case illustrated in Figs. 1 to 5 is a steering wheel having a thermoplastic covering about all or a portion of the core A of the wheel rim. At the ends of the mold cavity 26, the dies are so formed at the gripping portions 46 as to receive the enlargements 47 and securely grip them. This enables the dies to hold the part of the core or base A in correct position with reference to the die cavity 26 and the enlargements, consequently, also form closures for the ends of the mold cavity.

After the two dies have been brought into engagement by means of the toggle links 18 and cylinder 19, plasticized or semi-liquid thermoplastic material is forced into the die cavity through the passage 24 in the mold until the cavity of the mold is completely filled and the thermoplastic material 50 enters into engagement with the end portions 49 of the enlargements or separating elements 47. The thermoplastic material is maintained under high pressure in the mold cavity, and since the mold is cooled by suitable means (not shown), the material will solidify to form an envelope or sleeve around the wheel rim core A extending from one enlargement 47 to the other. When the material has become solidified by cooling, the pressure on the thermoplastic material is interrupted and the die plate 16 is moved away from the plate 17 so that the steering wheel with the molded section thereon may be removed from the dies and turned into another position to have another portion of the preformed core A positioned in the mold cavity 26 in the same manner as heretofore described in connection with the first portion of the wheel. The process is then repeated until the three portions of the wheel rim shown in Figs. 1 to 5 are covered with the thermoplastic material.

If the enlargements or separating elements 47 on the wheel are to be made of a thermoplastic material, the depressions or recesses 49 in the ends of the enlargement may be omitted or replaced by corresponding outwardly extending portions and the enlargements 47 may be molded on the wheel in the same or similar machine provided with another set of dies shaped to form the enlargements 47. The covering portions 50 can then be progressively sectionally molded on the wheel rim in the same manner as described.

While I have described the article as made by means of an injection molding machine of relatively small size, it will be obvious that the sections 50 of molded plastic material may be formed simultaneously on a larger machine, the sections being spaced apart to permit the spacing members 47 to be positioned between the ends of the sections 50. The sections may also be formed one at a time, or all at once, in a compression molding machine, of thermo-setting material or of a plastic rubber composition. The finished wheel will then have the advantage that when exposed to low temperatures, the sections may contract to a greater extent than the core A, so that the ends of the sections may move away from the enlargements or spacing members 47 of the core to a slight extent, thus avoiding cracking of the covering material. The construction described also permits a rotary or twisting movement of the ends of the sections 50 relatively to the enlargements or spacers 47 in case the core A twists or writhes.

In Figs. 6 to 8 inclusive, I have shown a wheel of modified construction made in a similar manner. In this wheel, the mold cavity is so formed that the progressively formed sections of molded plastic material 52 terminate at points approximately intermediate between the spokes. In forming these sections, the gripping portions 46 at the ends of the mold cavity are formed to engage the preformed wheel rim core A and thus form the ends of the sections 52. These ends may, for example, be provided with annular parts or projections 53, as clearly shown in Fig. 7. The mold cavity may also be provided with a portion which forms the molded plastic material at 54 around the outer ends of the spokes a. The molding of the three sections 52, is effected in a manner similar to that described in connection with the forming of the sections 50, except that these sections will not have their ends abutting against enlargements on the wheel rim. Instead the sections 52 will be spaced from each other. After the sections 52 have been molded on the wheel, either progressively or simultaneously, the spaces between the ends of the sections can be filled with inserts of any suitable or desired kind. For example, semicircular inserts 55 and 56 may be provided which fit into the spaces between adjacent sections 52 and telescopically engage the annular projections 53. These semi-annular inserts may be made of metal or of a molded plastic material and secured in place by means of a bolt or rivet 57 extending through the same and through a hole in the core A. The semi-annular inserts may also be made of thermoplastic material which may be readily cemented in place by wetting the inner faces of the inserts and the ends of the sections 52 with acetone or other solvent for the thermoplastic material. In this manner, the inserts can be securely cemented in place to the ends of the sections 52 and to each other, and if desired, a bolt 57 may also be used, the head of which could, for example, be molded into one of the semi-annular inserts.

It is, of course, also possible to produce the article shown in Figs. 6 to 8 by first applying the parts 55 and 56 to the base or core A and then molding the sections 52 to the rim as described in connection with Figs. 1 to 5.

The construction shown in Figs. 6 to 8 has the same advantages as that described in connection with Figs. 1 to 5. If the spacing members 55 are applied to the core A before the sections 52 are molded thereon, and if both spacing members and sections are formed of thermoplastic material, the ends of the sections 52 will not become integrally connected to the spacing members, since the hot plasticized thermoplastic material of the sections, when forced into contact with the cooler and solidified thermoplastic spacers 55, will not bond or firmly unite therewith. Consequently, the ends of the sections 52 on contracting, can separate from the spacing members 55 or can move circumferentially relatively thereto, to prevent cracking or splitting of the covering material.

In Figs. 9 and 10, I have shown a modified form of this invention which is applicable either to a rim of a steering wheel or to a straight or bent rod which may be employed as a core to which the molded plastic sections may be applied. In this case, spacing sleeves or ferrules 60 are provided which may be used as enlargements or separating elements for the sections, to cooperate with the gripping parts of a mold and which may form the ends of the mold cavity. These sleeves are preferably undercut at their ends to form a telescopic connection with the molded material and may be provided on their inner surface with a series of grooves or keyways 61 and 62 extending from the outer ends of the sleeve or ferrule 60 into proximity to the middle portion 63, which is formed for snug or tight engagement with a base or core 64, which may be the rim of a steering wheel or a straight or otherwise shaped rod. It will be obvious that after these sleeves or ferrules are correctly and equally spaced on the core or base 64, the molding of the sections 65 of the plastic material may be progressively or simultaneously effected in the same manner as heretofore described, the mold being so formed that the gripping portions 46 thereof cooperate with the sleeves or ferrules 60 to hold the core member 64 in correct relation to the mold cavity and to close the ends of the same. The hot plastic material then flows under pressure into the grooves or keyways 61 and 62 of the sleeves, which securely anchors the ends of the sections 65 and forms telescopic connections therewith.

When straight or only slightly curved articles are formed on an injection molding machine, it will be obvious that the machine may be used as heretofore constructed with straight tie bars or rods in place of one or more arched tie members, as shown in Figs. 1 to 3. If, for example, a relatively long rod, bar, plate, or piece is to be molded, a corresponding mold is placed into the machine and a prefabricated base to which the material is to be molded may, if desired, be used in connection with such mold and passed successively through the mold to progressively mold sections of molded plastic material thereon. If the preformed article is provided with enlargements which may be engaged by the mold at the ends of the mold cavity, then the sections of molded material may be formed between these enlargements, as indicated in Figs. 1 to 5, 9 and 10. If the preformed article has no enlargements, the plastic material may be molded on the preformed article by molding each section thereof to an edge or end of a preceding section. As another alternative, the mold itself at the ends of the cavity therein may be formed with gripping portions engaging the preformed article as described in connection with Figs. 6 to 8 inclusive, so that gaps are formed between the molded sections, which may be closed in any suitable manner, for example, by means of inserts of similar material which may be cemented or otherwise secured to the article between sections of molded material. It is also an advantage that the inserts used in this manner may be of different color, shade or texture than the main sections of the article and this makes it possible to produce artistic and pleasing effects that cannot be produced by processes in which the entire molded material is made in one piece. The variation in colors can also be produced by forming the enlargements 47 shown in Figs. 1 to 5 of molded plastic material of a different color from that of the sections 50.

Figure 12:
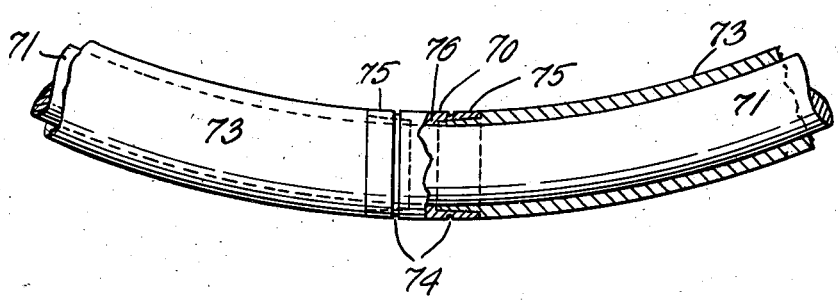
Fig. 12 is a fragmentary view, partly in section, of a portion of the rim, on an enlarged scale.

In Figs. 11 and 12, I have illustrated a steering wheel somewhat similar to the one shown in Figs. 6 to 8, except that the spacing members between molded sections of the covering material are of a different type. In this case, spacing members 70 are employed which are in the form of cylindrical sleeves made in one piece and these sleeves may be of a metal, of molded plastics, or of other materials. The required number of these sleeves, three in the construction illustrated, are placed on the wire or rod member from which the rim of the steering wheel is made, before the ends of the rim are welded together, and these sleeves 70 are then so positioned on the finished rim base or core 71, Fig. 12, so that one of these sleeves is located between each set of spokes 72. The molded plastic covering material 73 may be molded on the core and about portions of the spokes 72 in any desired manner, for example, by means of an injection molding machine as disclosed in Figs. 1 to 3, or these sections may be formed of thermosetting material or of a rubber composition. In any case, the parts 70 are set in correspondingly shaped parts of the mold, this being facilitated by the grooves 74, which may be placed into engagement with corresponding beads in the mold cavity to ensure a correct positioning of the spacing sleeve 70. In order to facilitate the movement of the spacing sleeves relatively to the core 71, it will be noted that the opposite ends of the sleeves are undercut, as indicated at 75, so that only the middle portion 76 of each sleeve bears against the core 71. These recessed portions 75 also permit the molded plastic material to enter into the spaces between the recessed portions 75 and the core 71 to form a telescopic or overlapping joint between the spacing sleeves 70 and the molded plastic material 73. This wheel may be formed either by progressive sectional molding of the plastic covering material on the wheel, or the several sections 73 of the covering material may be simultaneously molded in three separate sections, spaced apart by means of the spacing sleeves 70. Consequently, in the case of contraction of the molded material 73 to a greater extent than the core 71, as would happen when the wheel is subjected to low temperatures, the ends of the plastic material entering into the undercut portions 75 or abutting against the spacing sleeves 70 may withdraw to a slight extent from the positions shown in Figs. 11 and 12, thus forming slight gaps between the ends of the sleeves 70 and the molded plastic material 73, which gaps become closed when the wheel is again subjected to higher temperatures. Also the twisting or writhing of the core 71 can be taken up by a slight rotary movement of the covering material 73 relative to the sleeves 70 and the adjacent end of another section of the covering material.

Figure 13:
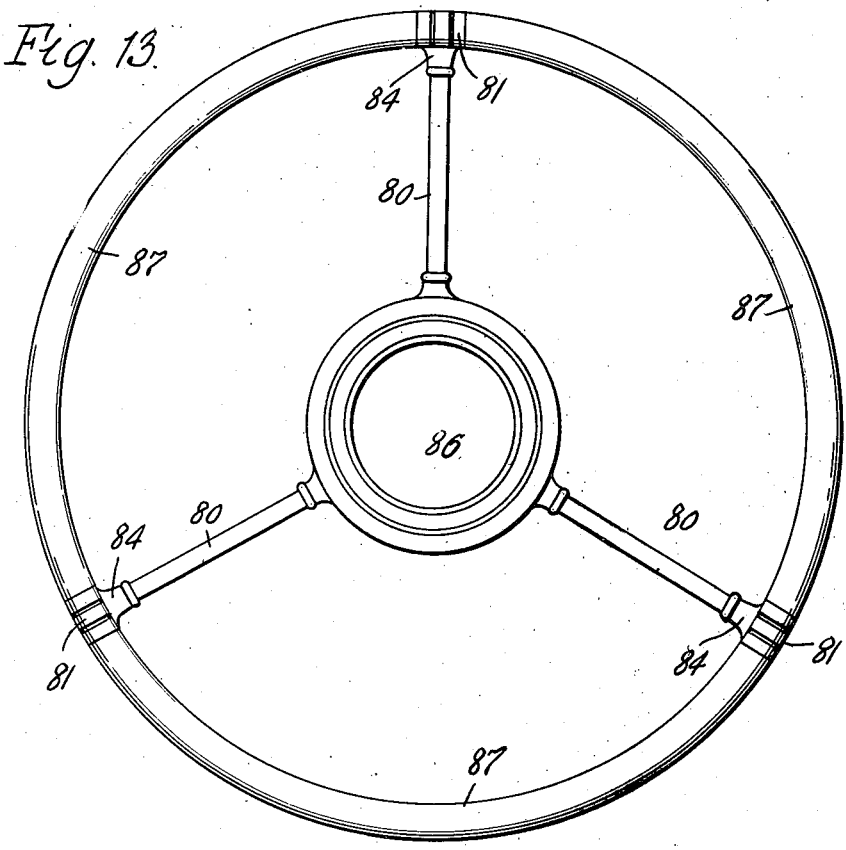
Fig. 13 is a plan view of still another modified form of steering wheel.
Figure 14:
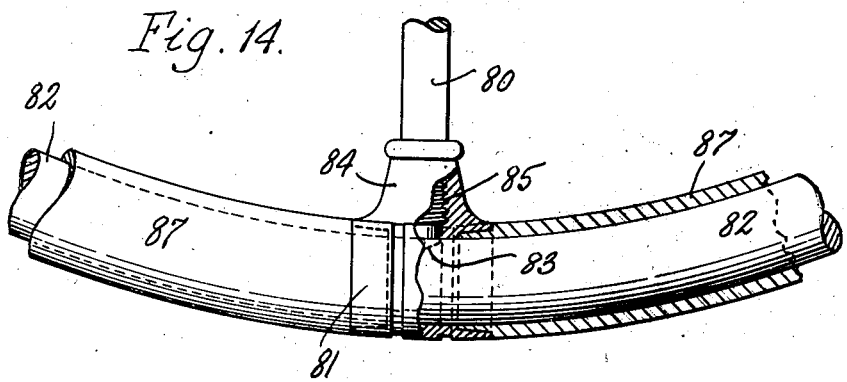
Fig. 14 is a fragmentary view thereof partly in section and on an enlarged scale.

In the construction shown in Figs. 13 and 14,

I have shown a steering wheel having spokes 80 and spacer members 81 which may be of metal or of molded plastic or other suitable material, and which may also be applied to the base or core 82 of the rim of the wheel in a manner similar to the sleeves 70 shown in Figs. 11 and 12, namely, by positioning them on the rim 82 before the two ends thereof are secured together, for example, by welding. In this construction, the spokes and the spacing members or sleeves 81 may be positioned on the core 82 of the rim by means of shallow apertures or recesses 83 formed on the inner face of the core 82, into which the outer ends of the spokes may enter. The sleeves or inserts 81 may be of approximately T shape, being provided with projections or tubular portions 84 extending toward the hub of the wheel and having internal threads 85. The spokes 80 have correspondingly threaded portions adjacent to their outer ends. In assembling the wheel, the spokes 80 are threaded into engagement with the screw threads 85 and so positioned on the core 82 that the ends thereof enter the recesses 83. In this manner, the spacing sleeves 81 and spokes 80 will be accurately held in correct positions on the core. The inner ends of the spokes may then be suitably secured to the hub portion 86 of the steering wheel in any suitable or well known manner.

The ends of the spacing sleeves 81 may, if desired, be recessed or undercut to receive some of the molded plastic material, and the plastic covering material 87 for the core 82 may be applied to the wheel in any suitable manner, either by injection molding, or by pressure molding as in the case of thermo-setting materials or rubber compositions. Furthermore, if desired, the sections 87 of molded plastic material may be either formed one at a time and in succession so as to permit the use of smaller machines or presses, or they can be formed in a single operation.

From the foregoing, it will be obvious that articles can be produced including a much larger quantity of molded plastic material than the normal capacity of the machine on which the articles are formed. Since the cost of machines of this kind increases very materially as the machines increase in size and capacity, it will be obvious that articles as herein described can be produced at a lower cost than heretofore possible, since they can be formed by the use of smaller and less expensive machines. Also since the dies required for progressive sectional molding are smaller than those required for molding large articles, it follows that the cost of producing such large articles in accordance with my process is further decreased. It is also well known that smaller molds will cool much faster than larger molds, and consequently, each molding operation on the small mold can be completed in a materially shorter time than an operation on a larger mold. In the manufacture of some types of articles, it is also more easily possible to accurately mold the plastic material on a preformed article, since relatively small portions of the preformed metal article are confined in a mold at one time, and such smaller portions can be more accurately positioned in a mold cavity than larger articles.

In addition to the use of my invention in connection with wheels or other circular objects, straight articles such as rods, panels or the like, it will be obvious that frames or other looped articles may be produced by progressively sectionally molding the same.

I claim as my invention:

A steering wheel including a rim having an annular metallic core and spokes secured at their outer ends to said core, said core having a covering formed mainly of sections of molded plastic material separated from each other by spacers, the outer diameter and contour of said sections and spacers being similar, said spacers being located on said core between said spokes and having their ends in telescopic arrangement with said sections but detached therefrom to permit expansion and contraction of said plastic material, said material covering the connections of said spokes with said core.

JOHN B. TEGARTY.